March 22, 1927.
A. B. DRÄGER
1,621,498
CHECK VALVE FOR RESPIRATING APPARATUS
Filed April 22, 1926
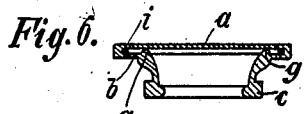
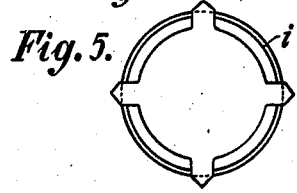
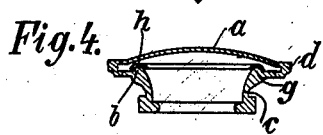
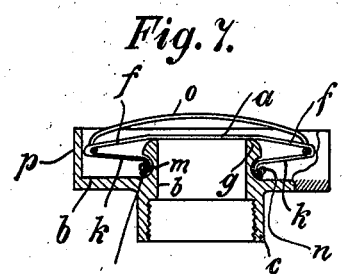
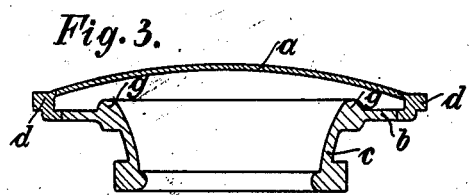
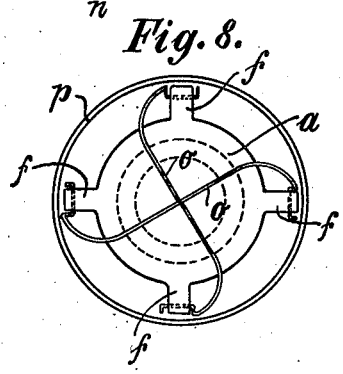
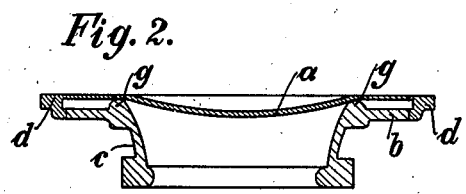
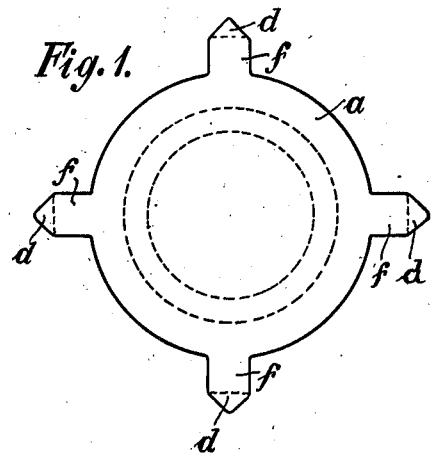
INVENTOR
ALEXANDER BERNHARD DRÄGER
BY
ATTORNEYS Patented Mar. 22, 1927.

1,621,498

UNITED STATES PATENT OFFICE.

ALEXANDER BERNHARD DRÄGER, OF LUBECK, GERMANY.

CHECK VALVE FOR RESPIRATING APPARATUS.

Application filed April 22, 1926, Serial No. 103,680, and in Germany July 4, 1925.

The present invention refers more particularly to respirating apparatus and to a check-valve therefor in which the valve proper is formed by a flexible diaphragm adapted in the closed position of the valve to rest on an annular seat. Diaphragms of this kind in existing constructions, are attached throughout their entire peripheries to the casings and in some recent check-valve arrangements have been supported only at certain portions of their peripheries on the seats or other parts of the valves.

In the present instance the diaphragm is provided on its periphery with a plurality of radial ears by which the diaphragm is held in position. The check-valve is particularly adapted to be used as an exhaling valve in respirators or filter-devices having a mask or mouth piece, and the object is to form a very tight closure even under the slightest movement of the air, to prevent noxious gases from entering from the outer atmosphere.

In existing valves of the indicated class, an efficient and perfect closure is not always secured because the diaphragm rests upon the seat, with too large a part of its surface, and it has also happened that after being out of use for several months the diaphragm adheres or clings to the seat and thereby renders the valve inoperative for its intended purpose.

These drawbacks are avoided by providing means to hold the diaphragm only at certain points of the periphery, and moreover by forming a bead on the valve proper or on the seat, so as to secure a close joint merely along a line. By choosing suitable materials in the construction of the device the possibility of the valve adhering to the seat will be reduced to a minimum. The reliability of operation of the valve may further be increased by tensioning the diaphragm to such an extent, that even in the normal position of the valve, that is when no breathing takes place, the diaphragm rests on the seat with a slight pressure.

In the drawing several modes of construction of the valve are illustrated by which the invention can be carried into effect. Fig. 1 is a plan; Figs. 2 and 3 are sections of the valve constructed according to the invention; Fig. 4 is the section of a modified construction; Figs. 5 and 6 are a plan and a section of another modification; Fig. 7 is a section, and Fig. 8 a plan of a third modification.

In the construction shown in Figs. 1 to 3 the diaphragm $a$ in its closed position is adapted to rest on the annular seat $g$, arranged on a carrier $b$, which in the constructions shown has a tube-like neck $c$, by which the valve may be attached to any kind of respirating apparatus. The diaphragm is provided on its periphery with a number of radial lugs or ears $f$, the ends $d$ of which are fastened to any fixed part of the valve and preferably to the carrier $b$ of the valve seat $g$.

To avoid a too large contacting surface between the diaphragm and the seat, either the diaphragm or the seat is provided with a bead. In the construction shown the seat itself is rounded off, or is given a more or less sharp edge to form the bead $g$. Thus when the diaphragm rests on the seat the contact will merely take place along a line, thereby insuring a good closure.

Both, the seat as well as the diaphragm, may be made of flexible or elastic material, such as rubber. To prevent the two from adhering or clinging to one another when the valve has not been used for a long time, either the bead or the seat $g$ may be made of metal, or if made of rubber it may, as shown in Fig. 4, be provided with a metal ring $h$ of curved cross section; alternatively it may be of advantage to make the diaphragm of leather instead of rubber, because leather generally will not adhere or stick to metal. If it is found convenient to make the seat and even its bead of rubber, it may be of advantage to plate the diaphragm at least at such places where it contacts with metal, for instance with thin tin foil, or the like.

If the seat $g$ is of metal it may be made in one with the valve carrier $b$ and the neck $c$ or these elements may be made in independent sections.

It may be of advantage to construct the valve so as to adapt the diaphragm to rest on the seat with a slight pressure when the valve is not in operation. In the construction shown in Figs. 1 to 3 the diaphragm $a$, with its radial ears $f$, is so constructed, that when no breathing takes place, that is to say, when the valve is at rest, the diaphragm curves down, as is shown in Fig. 2. The tension inherent in the diaphragm will then cause the diaphragm to bear against the seat with a slight pressure. In exhaling, the diaphragm will bulge outwardly as shown in Fig. 3.

In the construction shown in Figs. 5 and 6 the tension given to the diaphragm $a$ to cause the latter to rest on the seat with a slight pressure is secured by means of an annular spring $i$, which engages the ends of the ears and presses them against the upturned flange of the seat carrier $b$. In this case it is of advantage to make the seat carrier $b$ and preferably also the neck $c$ of an elastic material. In the construction shown in Figs. 1 to 3, the corresponding parts are indicated as being made of metal although said parts may also be made of elastic material, such as rubber, if desired.

In the modification shown in Figs. 7 and 8 it is assumed that the neck $c$ together with the seat carrier $b$ and the seat $g$ itself are made of metal. The radial ears $f$ are turned inwardly, so as to produce prolongations $k$, the ends of which are held within an annular groove $m$ below the seat $g$, by a wire $n$ or cord or the like. The lugs or prolongations $k$ may be elastic in themselves to hold the diaphragm $a$ stretched, so as to allow the diaphragm $a$ to rest on the seat $g$ with a slight pressure. However, if the lugs $k$ and the ears $f$ are made of pliable material each pair of opposite ears may be engaged by the ends of an S-shaped spring $o$ as is shown in Fig. 8. Thus if there are four ears and lugs, two springs $o$ crossing one another will be used; the springs thus being tensioned will have the tendency to stretch the diaphragm $a$. The seat carrier $b$, which is generally expanded to form a disk, may be provided with an annular flange $p$ to constitute a dish for enclosing the delicate parts of the valve and to enable the valve to be conveniently gripped when it is dismounted.

I claim:—

1. A check-valve for respirating apparatus comprising a carrier including elastic portions and an annular seat, a flexible diaphragm adapted to rest on said seat, a plurality of ears projecting radially from said diaphragm and attached to the elastic portions of said carrier, and a spring engaging said radial ears for maintaining said diaphragm in a stretched condition.

2. A check-valve for respirating apparatus comprising a carrier including a valve-seat, a flexible diaphragm adapted to rest on said seat, a plurality of ears projecting radially from said diaphragm and a spring engaging the radial ears for maintaining the diaphragm in a stretched condition, said ears being turned back from said spring and attached to said carrier.

3. A check-valve for respirating apparatus comprising a carrier having a groove and including a valve-seat, a flexible diaphragm adapted to rest on said seat, a plurality of ears projecting radially from said diaphragm and being turned back toward said carrier, means for securing the ends of said ears in said groove, and a spring engaging the radial ears for maintaining the diaphragm in a stretched condition.

4. A check-valve for respirating apparatus comprising a carrier including a valve-seat, a flexible diaphragm adapted to rest on said seat, a plurality of ears projecting radially from said diaphragm, in opposite directions in pairs, and S-shaped springs engaging the opposite ears of each pair for maintaining the diaphragm in a stretched condition.

5. A check-valve for respirating apparatus comprising a carrier including an annular seat, a flexible diaphragm adapted to rest on said annular seat, a plurality of flexible ears projecting radially from the periphery of the diaphragm for maintaining the latter in operative relation to said seat, and an annular flange on said carrier independent of said diaphragm and surrounding the periphery thereof to enclose the valve elements and constituting a means for enabling the valve to be conveniently gripped.

In testimony whereof I have signed my name to this specification.

ALEXANDER BERNHARD DRÄGER